(12) United States Patent
Anderson et al.

(10) Patent No.: US 11,541,491 B2
(45) Date of Patent: Jan. 3, 2023

(54) FASTENING SYSTEM (71) Applicant: JR Automation Technologies, LLC, Holland, MI (US)

(72) Inventors: Ryan Nathan Anderson, Dayton, OH (US); Joseph Robert Russell, Jenison, MI (US)

(73) Assignee: JR AUTOMATION TECHNOLOGIES, LLC, Holland, MI (US)

(*) Notice: Subject to any disclaimer, the term of this patent is extended or adjusted under 35 U.S.C. 154(b) by 0 days.

(21) Appl. No.: 17/558,074

(22) Filed: Dec. 21, 2021

(65) Prior Publication Data

US 2022/0219268 A1 Jul. 14, 2022

Related U.S. Application Data

(62) Division of application No. 16/708,263, filed on Dec. 9, 2019, now Pat. No. 11,203,089.

(60) Provisional application No. 62/776,522, filed on Dec. 7, 2018.

(51) Int. Cl.
| | |
|---|---|
| *B23P 19/06* | (2006.01) |
| *B25B 21/00* | (2006.01) |
| *B25B 23/00* | (2006.01) |
| *B25B 13/48* | (2006.01) |

(52) U.S. Cl.
CPC ............ *B23P 19/06* (2013.01); *B25B 13/488* (2013.01); *B25B 21/002* (2013.01); *B25B 23/0035* (2013.01); *B25B 23/0085* (2013.01)

(58) Field of Classification Search
CPC ............ B25B 23/0085; B25B 23/0035; B25B 13/488; B25B 21/002; B23P 19/06
See application file for complete search history.

(56) References Cited

U.S. PATENT DOCUMENTS

| | | | | | |
|---|---|---|---|---|---|
| 2,882,773 | A | * | 4/1959 | Wing | .................... B25B 21/002 81/475 |
| 3,247,741 | A | * | 4/1966 | Batten | ................... B25B 21/002 81/56 |
| 4,989,442 | A | * | 2/1991 | Rosier | .................... B21J 15/022 72/391.2 |
| 5,245,743 | A | * | 9/1993 | Landy | ................... F16B 37/044 29/523 |
| 5,305,666 | A | * | 4/1994 | LaTorre | .............. B25B 23/1415 81/55 |
| 5,343,784 | A | * | 9/1994 | Neuhaus | ................. B25B 13/48 81/177.85 |
| 8,061,019 | B2 | * | 11/2011 | Bisiach | ................... B21J 15/022 29/798 |

(Continued)

*Primary Examiner* — Jason L Vaughan
(74) *Attorney, Agent, or Firm* — The Watson IP Group, PLC; Jovan N. Jovanovic (57) ABSTRACT

A fastening system including a frame, a movement control assembly, a fastener drive assembly and a collar presenting assembly. The frame can be coupled to an outside structure, for example, with a part that is to be coupled with a fastener attached to the frame. The movement control assembly is configured to controllably move the fastener drive assembly relative to the frame and the part so as to grasp the collar of the fastener, engage the threaded pin of the fastener and to threadedly engage the two structures together. The collar presenting assembly presents a collar of a fastener to the fastener drive assembly.

19 Claims, 11 Drawing Sheets

(56) References Cited

U.S. PATENT DOCUMENTS

| | | | |
|---|---|---|---|
| 8,156,844 B2* | 4/2012 | MacArthur | B25B 21/002 81/55 |
| 8,430,001 B2* | 4/2013 | Ortiz | B25B 13/06 81/125 |
| 9,120,209 B1* | 9/2015 | Schevers | B25B 21/002 |
| 9,296,076 B2* | 3/2016 | Soto Martinez | B64F 5/10 |
| 10,046,377 B2* | 8/2018 | Batt | B21D 39/00 |
| 10,245,688 B2* | 4/2019 | Mathis | B23P 19/06 |
| 10,495,128 B2* | 12/2019 | Johnson | B25B 17/00 |
| 2016/0096256 A1* | 4/2016 | Calianno | B25B 23/0035 173/218 |

* cited by examiner

FASTENING SYSTEM

CROSS-REFERENCE TO RELATED APPLICATION

This application is a divisional of U.S. patent application Ser. No. 16/708,263 filed Dec. 9, 2019, entitled "Fastening System" which claims priority from U.S. Provisional Patent Application Ser. No. 62/776,522 filed Dec. 7, 2018, entitled "Fastening System", the entire disclosure of which is hereby incorporated by reference in its entirety.

BACKGROUND OF THE DISCLOSURE

1. Field of the Disclosure

The disclosure relates in general to automated industrial equipment, and more particularly, to a fastening system that is configured for the automated engagement, coupling and/or actuating of fasteners typically known as Hi-Lok® fasteners (which shall include other fasteners that operate on the same general principles as Hi-Lok® fasteners).

2. Background Art

The fastening of components is well known in the art. In the aviation assembly art, a Hi-Lok® fastener is typically employed to join components, especially wherein vibrations or the like limit the use or desirability of rivets.

Typically, the assembly and tightening of a Hi-Lok® type fastener is completed manually through the use of a hand tool (such as a drill or the like having the appropriate bit). Problematically, such a manual procedure is time consuming and labor intensive. Additionally, in many instances, it takes time to properly align the tool with the fasteners during installation.

SUMMARY OF THE DISCLOSURE

The disclosure is directed to a fastening system that has a frame, a movement control assembly, a fastener drive assembly and a collar presenting assembly. The frame can be coupled to an outside structure, for example, with a part that is to be coupled with a fastener attached to the frame. The movement control assembly is configured to controllably move the fastener drive assembly relative to the frame and the part so as to grasp the collar of the fastener, engage the threaded pin of the fastener and to threadedly engage the two structures together.

In an aspect of the disclosure, the disclosure is directed to a fastener drive assembly comprising a base, a collar coupling assembly and a pin coupling assembly. The collar coupling assembly has a collar portion extending from the and terminating at a collar engagement tip. The collar engagement tip is structurally configured to engage a collar having a threaded bore.

The pin coupling assembly has a pin shaft extending away from the base, within the collar portion and through the collar engagement tip. The pin shaft terminates at an engagement end that is structurally configured to engage an engagement bore of a threaded pin.

At least one of the collar engagement tip and the pin shaft is rotatable relative to the other of the collar engagement tip and the pin shaft, so as to impart relative rotation of the engagement end of the pin shaft and the collar engagement tip about an axis of rotation. Additionally, at least one of the engagement end of the pin shaft and the collar engagement tip is translatable relative to the base along the axis of rotation of the pin shaft.

In some configurations, the collar coupling assembly further includes a upper collar portion and a lower collar portion, with the upper collar portion terminating in the collar engagement tip, and, being translatable relative to the lower collar portion along the axis of rotation of the pin shaft, while the upper and lower collar portions are precluded from rotation relative to each other about the axis of rotation.

In some configurations, the upper collar portion and the lower collar portion are telescopically coupled to each other.

In some configurations, the collar coupling assembly includes a telescopic control assembly including a slot member defined in one of the upper and lower collar portions and a pin member slidably positionable within the slot member positioned on the other of the upper and lower collar portions. The movement of the pin member within the slot member defines the relative translation of the upper collar portion relative to the lower collar portion.

In some configurations, a biasing member extends between the lower collar portion and the upper collar portion to direct the pin member to an end of the slot member, and so as to direct the collar engagement tip away from the base.

In some configurations, the pin coupling assembly is rotatable relative to the base about the axis of rotation through an arcuate distance that is less than a full circle and is precluded from a full rotation about the axis of rotation.

In some configurations, the pin coupling assembly is translatable along the axis of rotation between a first position and a second position. In the second position, the engagement end is directed away from the base. A biasing member directs the pin coupling assembly into the second position.

In some configurations, the fastener drive assembly further includes a driver coupled to the upper collar portion or the lower collar portion to impart rotation thereto.

In another aspect of the disclosure, the disclosure is directed to a fastening system. The fastening system includes a frame, a fastener drive assembly, as discussed above. The frame has a part presentation member with an upper surface. The fastener drive assembly is translatable relative to the frame to direct the fastener drive assembly toward and away from the upper surface of the part presentation member.

In some configurations, the fastening system further includes a collar presenting assembly including a pair of gripping jaws and a movement assembly. The pair of gripping jaws structurally configured to grasp the collar of a fastener. The movement assembly including a pivot axis coupled to the frame. The gripping jaws are pivotably coupled to the pivot axis. The pair of gripping jaws can be pivoted into a position about the pivot axis so that a collar positioned with the pair of gripping jaws aligns with the collar engagement tip of the collar coupling assembly. Upon translating of the fastener drive assembly relative to the frame directs the collar member into the collar coupling assembly.

In some configurations, the gripping jaws are structurally configured whereupon pivoting of the pair of gripping jaws about the pivot axis with a collar positioned within the collar engagement tip and within the gripping jaws releases the collar from within the gripping jaws without releasing the collar from the collar engagement tip.

In some configurations, the fastening system further includes a movement control assembly having a rail coupled to the frame and a block slidably movable along the rail. The block is coupled to the base of the fastener drive assembly. A movement actuator is structurally configured to control movement of the block along the rail, thereby adjusting the position of the fastener drive assembly relative to the part presentation member of the frame.

In another aspect of the disclosure, the disclosure is directed to a method of attaching a fastener to a part comprising the steps of: providing a part on a part presentation member, the part having an opening extending therethrough; providing a fastener including a threaded pin having an engagement bore at a distal end thereof and a collar; directing the threaded pin through the opening; providing a fastener drive assembly; positioning the collar in the collar engagement tip; directing the fastener drive assembly toward the part; directing the engagement end of the pin shaft into the engagement bore of the threaded pin; directing the collar engagement tip into engagement with a threaded portion of the threaded pin; rotating at least one of the collar engagement tip and the pin shaft relative to the frame to thread the collar onto the threaded portion of the threaded pin; and translating at least one of the collar engagement tip and the pin shaft relative to the part presentation member during the step of rotating.

In some configurations, the step of positioning the collar in the collar engagement tip further comprises the steps of: placing the collar in a pair of gripping jaws; moving the pair of gripping jaws such that the collar overlies the collar engagement tip of the collar coupling assembly; directing the fastener drive assembly so that the collar is positioned within the collar engagement tip; and moving the pair of gripping jaws to, in turn, release the collar from the gripping jaws.

In some configurations, the step of positioning the collar in the collar engagement tip further comprises the step of: rotating the collar engagement tip in either one of a first direction and a second direct so as to align the collar with the collar engagement tip.

In some configurations, prior to the step of rotating the collar engagement tip, the method further comprises the steps of: contacting the collar engagement tip with the collar; biasing the collar engagement tip against collar, In some configurations, the step of directing the engagement end of the pin shaft into the engagement bore of the threaded pin further comprises the step of: rotating the pin shaft to align the engagement end with the engagement bore.

In some configurations, prior to the step of rotating the engagement end of the pin shaft, the method further comprises the steps of: contacting the engagement end of the pin shaft with the distal end of the threaded pin; biasing the pin shaft against the distal end of the threaded pin.

In some configurations, the step of rotating at least one of the collar engagement tip and the pin shaft further comprises the step of: rotating the collar engagement tip with a servomotor; and precluding rotation of the pin shaft relative to the collar engagement tip.

In some configurations, the steps of directing the fastener drive assembly toward the part comprises the step of controlling a servomotor.

BRIEF DESCRIPTION OF THE DRAWINGS

The disclosure will now be described with reference to the drawings wherein.

DETAILED DESCRIPTION OF THE DISCLOSURE

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 1:
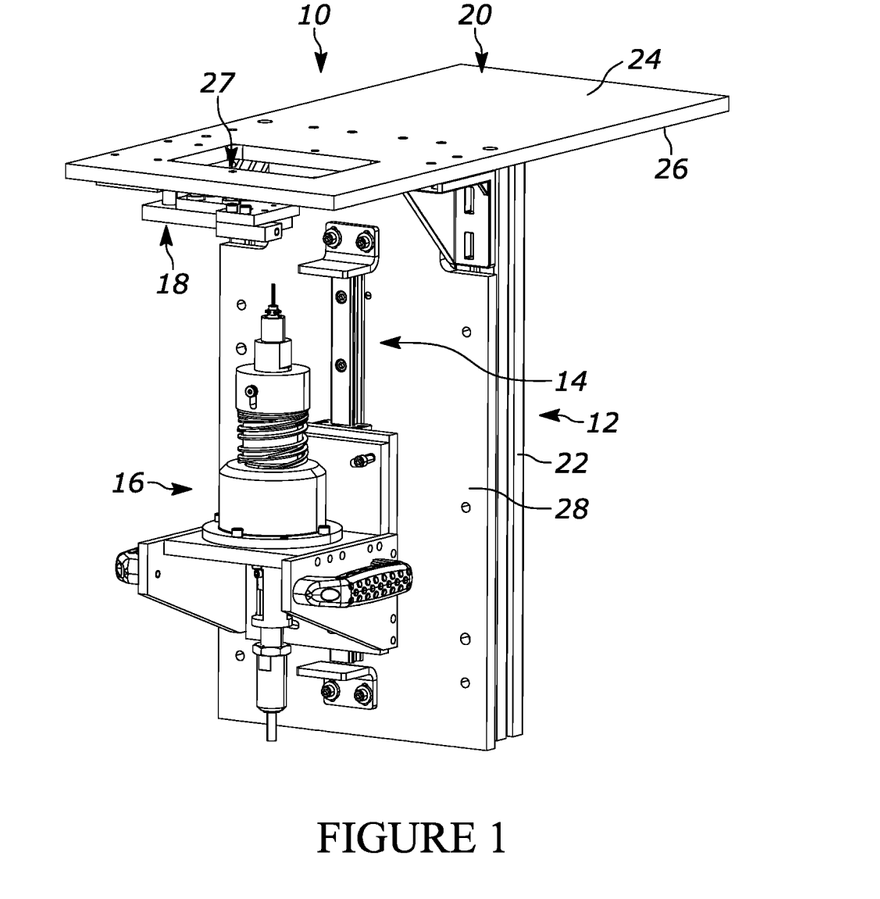
FIG. 1 of the drawings is a perspective view of the fastening system of the present disclosure.
Figure 2:
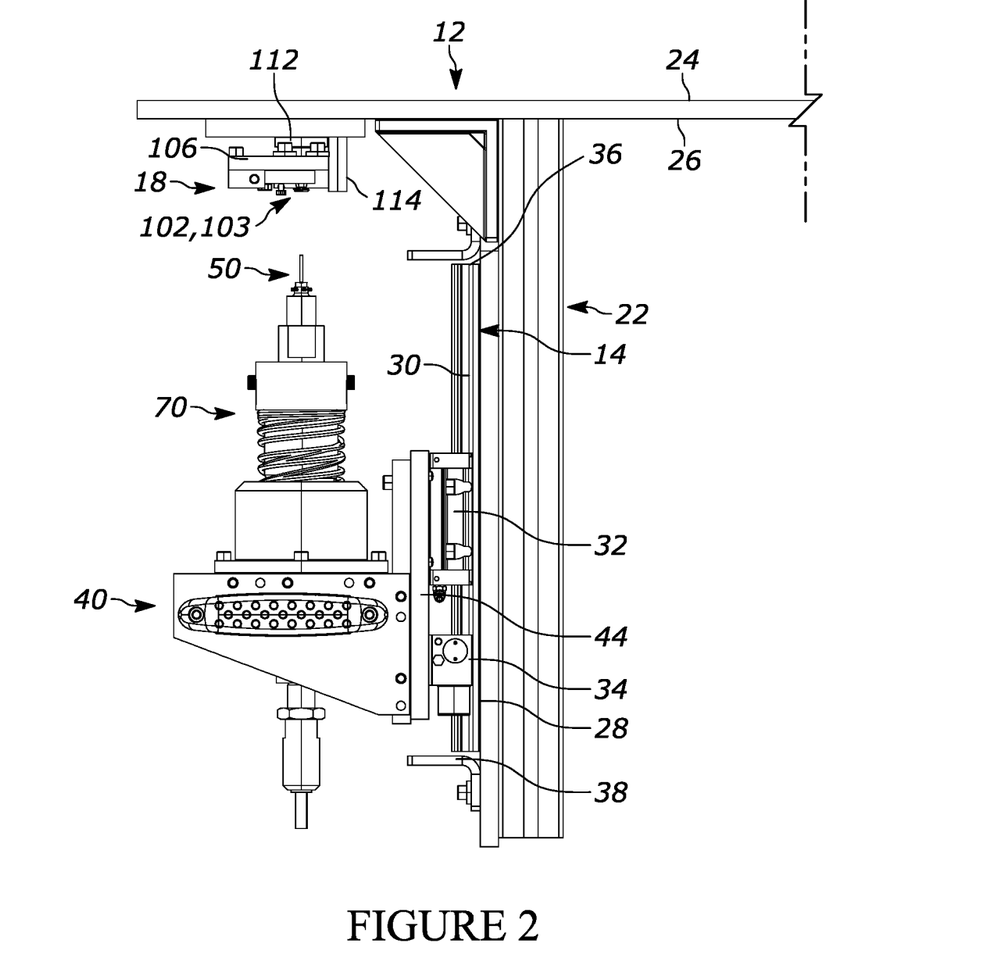
FIG. 2 of the drawings is a first side elevational view of the fastening system of the present disclosure.
Figure 3:
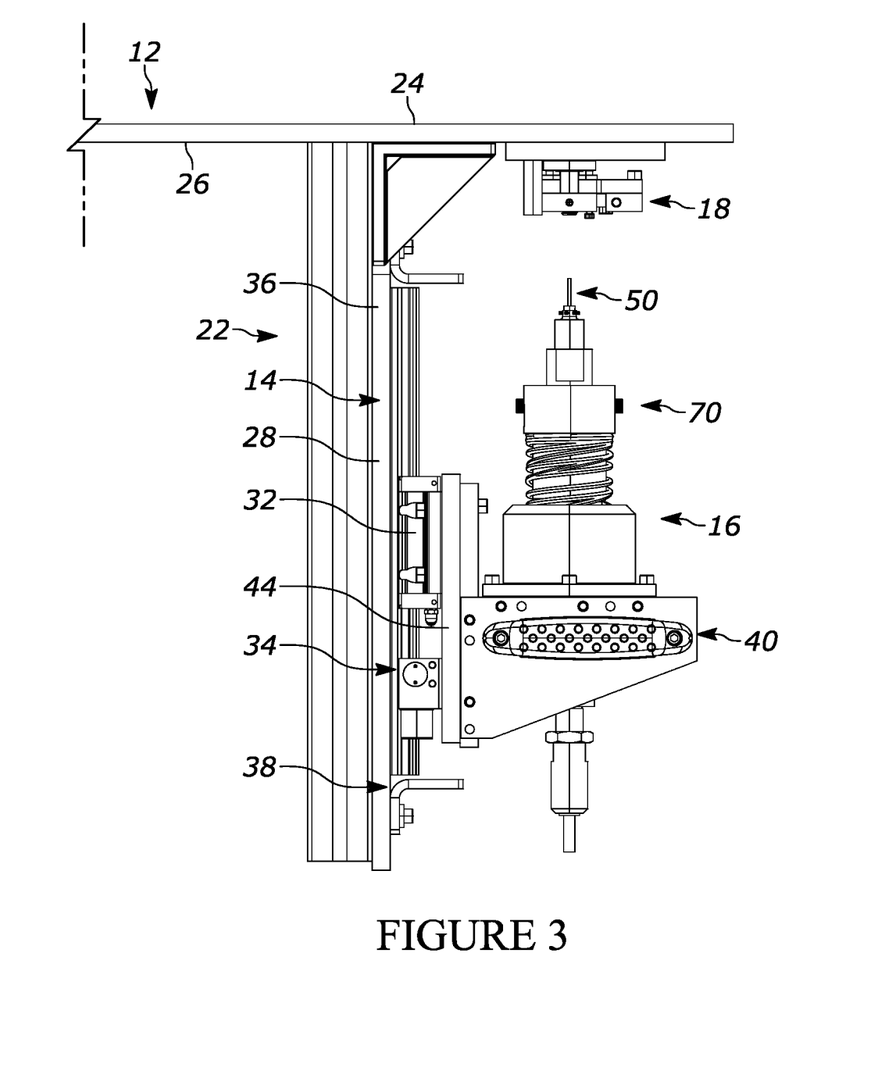
FIG. 3 of the drawings is a second side elevational view of the fastening system of the present disclosure.

Referring now to the drawings and in particular to FIGS. 1 through 3, the fastening system is shown generally at 10. The fastening system includes frame 12, movement control assembly 14, fastener drive assembly 16 and collar presenting assembly 18. The frame 12 provides a structure to which the other components can be coupled, and also a structure which can receive and (through various structures retain) a workpiece or assembly to which the fastener is to be coupled. The movement control assembly provides motion to the fastener drive assembly. The collar presenting assembly provides for the positioning of the collar to be received by the fastener drive assembly. The configuration shown provides a generally manually actuated system. It will be understood that through the use of controlled servo motors pneumatic actuators and/or other structures, the entire process can be further automated. Such further automation is described, at least in part, below.

It will be understood that in the configuration shown, the system is shown as having a generally vertical configuration, with the fastener that is to be fastened being oriented in a generally vertical orientation. It will be understood that this is exemplary only and that the fastener and the entire system can be presented in any configuration from horizontal to vertical, as well as angularly oblique thereto. Thus, the notations as to vertical or horizontal are relative only, and, not to be deemed limiting the orientation of the device to be such that fasteners are actuated solely in the vertical orientation. It is, for example, contemplated that the fastener assembly may be coupled to the end of a robotic arm such that the vertical will refer to the direction of the movement of the componentry to couple and rotate the fastener components.

Figure 8:
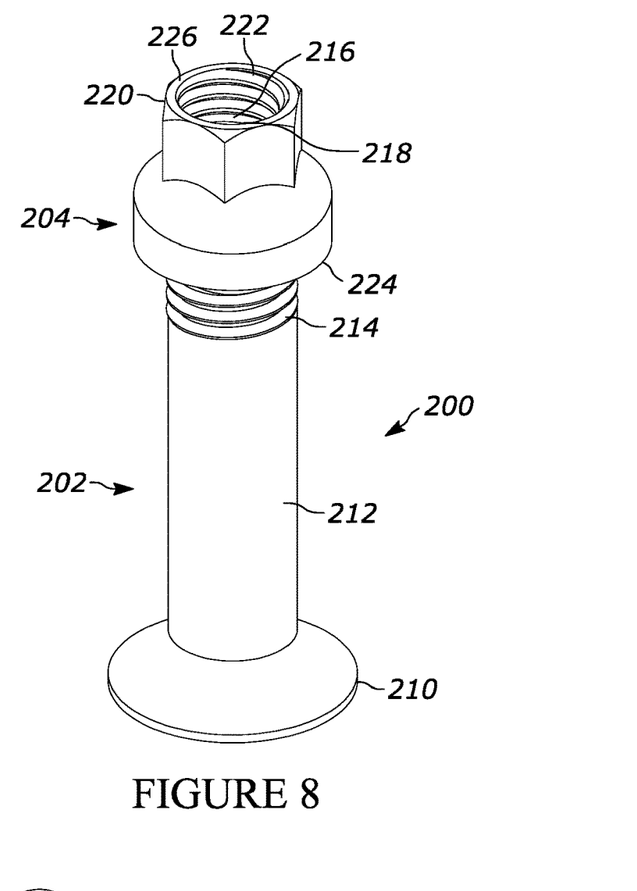
FIG. 8 of the drawings is a perspective view of a fastener of the type known generally as a Hi-Lok® fastener.
Figure 9:
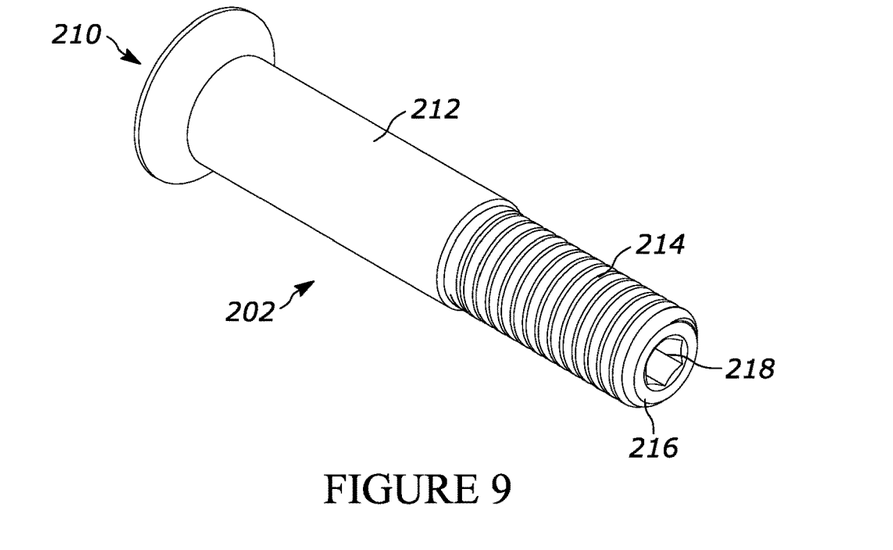
FIG. 9 of the drawings is a perspective view of the threaded pin of the fastener known generally as a Hi-Lok® fastener.

The fastening system is utilized in association with a fastener, such as fastener 200 shown in FIGS. 8 and 9. Such a fastener is known in the industry as the Hi-Lok® fastener. Such a fastener includes a threaded pin 202 and a collar 204 attachable to the threaded pin. The threaded pin 202 includes head 210, shank 212 that has a threaded portion 214 a distal end 216 and an engagement bore 218. In the configuration shown, the engagement bore comprises a hexagonal cross-sectional configuration.

The collar 204 includes outer surface 220 and bore 222. The collar further includes part contact end 224 and tool end 226. The outer surface 220 may include a grasping structure, such as a hexagonal configuration (much like a nut) or another graspable structure that can preclude rotation of the collar, or that can grasp the collar for purposes of rotating the same. The bore 222 can be threaded to match the threads of the threaded pin. In some configurations, the threads of the bore can be configured so as to exert a bias against, to deform due to, or to lock against the threads of the threaded pin to provide additional holding strength.

Figure 10:
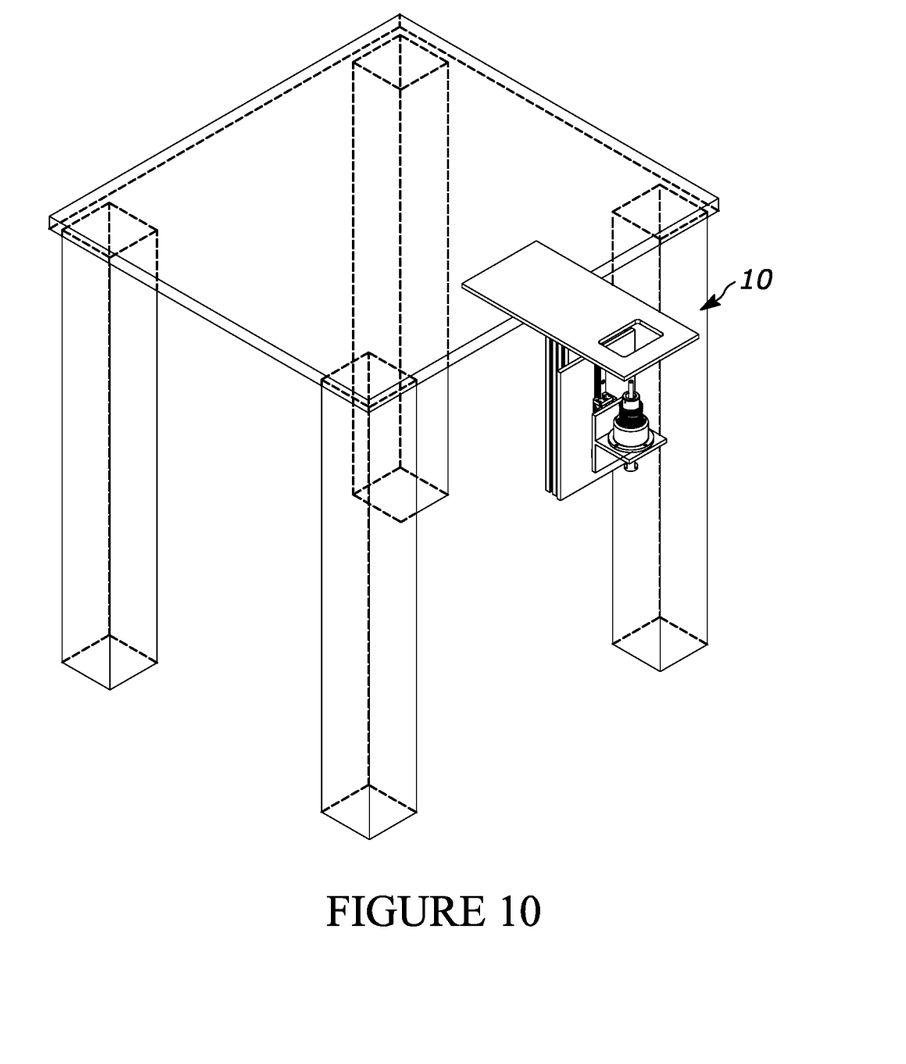
FIG. 10 of the drawings is a perspective view of the fastening system coupled to an outside table.

With reference to FIGS. 1 through 3, the frame 12 includes part presentation member 20, and tool coupling subframe 22. The frame 12 may be free standing (that is, having feet and/or legs) or may be clamped or attached to another structure, such as a table (FIG. 10), stand or the like. The part presentation member 20 includes upper surface 24 (upon which the part would be positioned, for example), lower surface 26 opposite the upper surface and window opening 27. The window opening 27 provides access to the workpiece (and the fastener) from below the part presentation member.

The tool coupling subframe 22 is shown as comprising mounting plate 28. It will be understood that the fastener drive assembly 16 is coupled to the tool coupling subframe (and to the mounting plate 28) by way of the movement control assembly 14.

The movement control assembly 14 in the configuration shown, is primarily intended to allow for vertical movement (i.e., an up and down movement) of the fastener drive assembly 16 relative to the frame 12. Again, the disclosure is not limited to vertical or up and down movement solely. The movement control assembly comprises rail 30, block 32 and movement actuator 34. The rail 30 is fixedly mounted to the frame 12, and in the configuration shown, to the tool coupling subframe 22. The rail 30 is generally mounted in a vertical orientation in the configuration shown, and defines a first end 36 and a second end 38.

The block 32 is slidably engageable on the rail 30 and can be slidably directed between the first end and the second end of the rail 30. The distance between the first end 36 and the second end 38 generally defines the travel distance that the block 32 can slide relative to the rail. It will be understood that the block 32 is coupled to the fastener drive assembly and therefore controls the movement of the fastener drive assembly along the rail mounted to the frame. A movement actuator or control such as movement actuator 34 may be coupled to the base of the fastener drive assembly 16 or to the block 32. The movement actuator can control the movement (as well as maintain a desired position) of the block relative to the rail. Other movement control assemblies are contemplated, such as mechanical linear actuators, among others.

Figure 4:
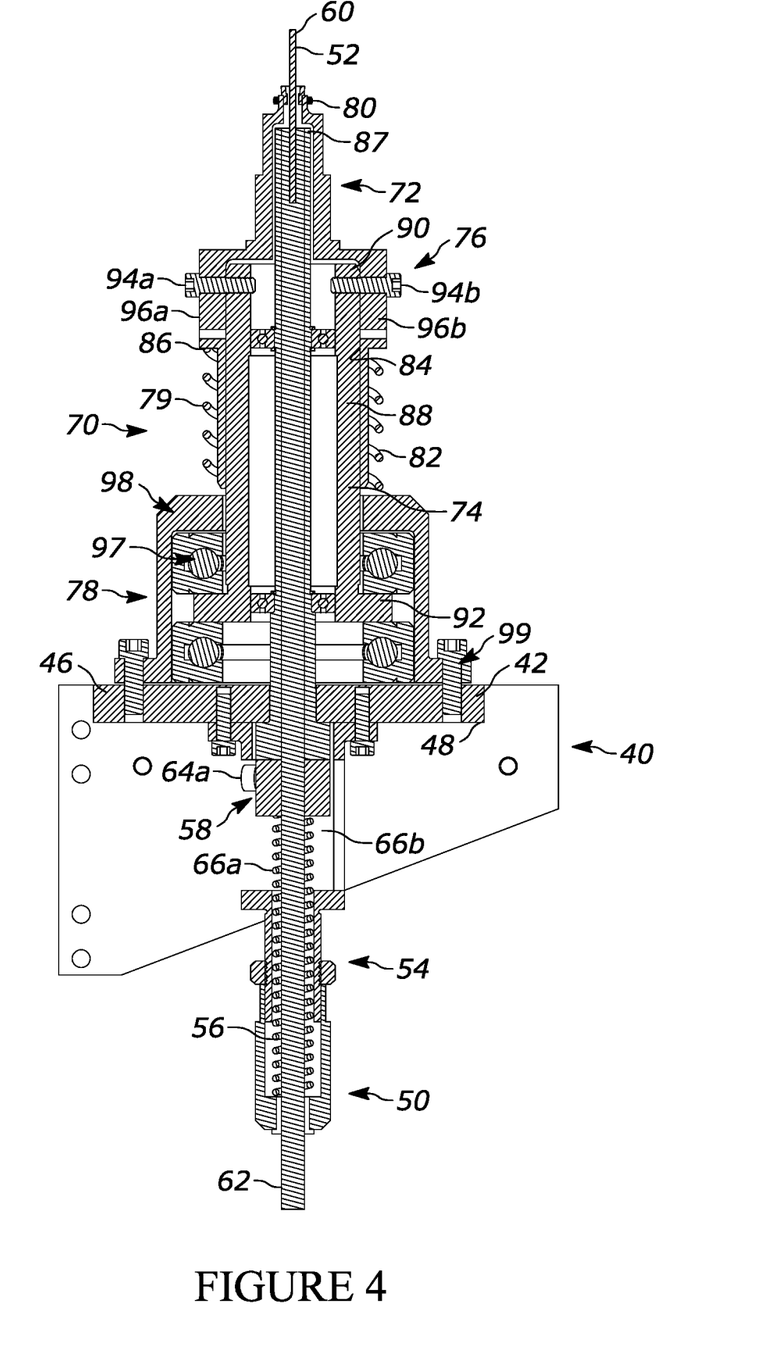
FIG. 4 of the drawings is a side cross-sectional view of the fastening system of the present disclosure.
Figure 5:
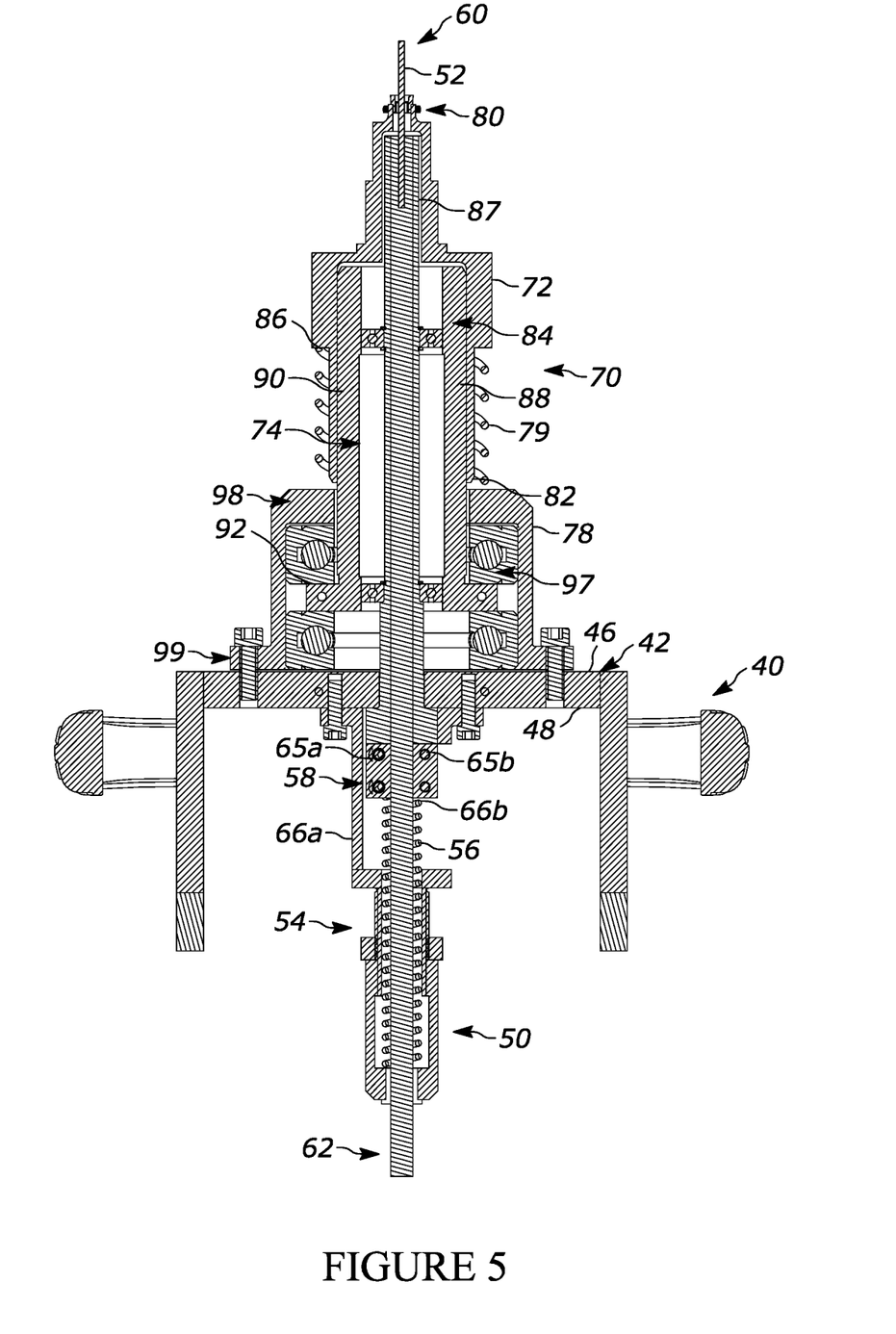
FIG. 5 of the drawings is a front cross-sectional view of the fastening system of the present disclosure.

With reference to FIGS. 4 and 5, the fastener drive assembly 16 is shown as comprising base 40, pin coupling assembly 50 and collar coupling assembly 70. The base 40 includes mount plate 42 and back plate 44. The mount plate and the back plate are coupled to each other. The block 32 of the movement control assembly is coupled to the back plate 44 of the base. The mount plate includes upper surface 46 and lower surface 48, with a bore extending therethrough. The pin coupling assembly and the collar coupling assembly are mounted to the base, and move with the base relative to the frame 12. In the configuration shown, the mount plate 42 and the back plate 44 are coupled in a generally orthogonal configuration. It is contemplated that the fastener drive assembly may be mounted to the end of a robotic arm and may move from location to location relative to a part which may be moving or stationary. In such an instance, the orientation of the fastener drive assembly may be along any different planes (and the axis that is described as vertical, it will be understood, generally corresponds to the axis of the fastener and generally perpendicular to the rotation of the fastener to couple the components). Additionally, in such a configuration, the robotic arm may include the collar presenting assembly, or the collar presenting assembly may comprise a separate component.

The pin coupling assembly 50 is shown as comprising pin shaft 52, base housing 54, biasing member 56 and movement control system 58. The pin shaft 52 extends generally vertically through the bore of the mount plate 42 (in a generally central location) and generally defines an axis of rotation, as is shown in the drawings. The pin shaft has a fastener engagement end 60 and a distal end 62. The fastener engagement end 60, in the configuration shown, comprises a hexagonal wrench that is configured to engage the engagement bore 218 of the fastener 200. The base housing 54 comprises a cylindrical member that is fixedly coupled to the lower surface 48 of the mount plate, and through which the pin shaft 52 extends.

The movement control system 58 of the pin coupling assembly controls the movement (rotational and translational) of the pin shaft relative to the base 40. The movement control system 58 includes pin collar 64 that includes opposing projections 65a, 65b. The pin collar is fixedly engaged with the pin shaft. The opposing projections extend generally orthogonally and radially outward from the pin shaft 52. A pair of control openings 66a, 66b are defined within the base housing, with the opposing projections extending out through the pair of control openings 66a, 66b, respectively. As the openings are larger than the projections, the projections remain disposed within the openings as the pin shaft rotates and translates. It will be understood that the amount of rotation and translation of the pin shaft relative to the base is limited or controlled by the size of the openings relative to the size of the projections. In the configuration shown, the shaft is permitted to translate in an up and down direction a predetermined distance, and also to rotate a predetermined distance (about 70° for when the engagement bore is a hexagon). As will be explained, the movement allows for the relative movement of the pin shaft 52 and the threaded pin so as to facilitate engagement of the engagement end with the engagement bore (generally through rotation of one relative to the other), and also to allow for translation of the pin shaft with the threaded pin upon tightening and movement of the fastener drive assembly relative to the frame. A biasing member, such as spring 56, can pre load or pre set the pin shaft in a desired orientation. In some configurations, the biasing member directs the pin shaft in an upward direction biasing the opposing projections against the upper end of the control openings. Additionally, the biasing member can also bias the opposing projections along a vertical wall of the opening thereby allowing rotation in one direction (i.e., at one end of rotational travel). In some configurations, multiple biasing members may be employed. It will be understood that variations are contemplated wherein the pin is rotated relative to a stationary collar, or where both are rotated at different speeds or different directions relative to each other).

The collar coupling assembly 70 is shown as comprising upper collar portion 72, lower collar portion 74, telescopic control assembly 76, hub 78 and biasing member 79. The upper collar portion and the lower collar portion are telescopically engaged with each other with the biasing member 79 cooperating with the telescopic control assembly to control the relative telescopic position. The hub 78 allows for rotative movement of the lower collar portion (which is rotationally coupled through the telescopic control assembly to the upper collar portion) relative to the pin shaft 52 and the base 40.

In greater deal, the upper collar portion 72 includes collar engagement tip 80, lower end 82 opposite the collar engagement tip, as well as a central bore 84 and a flange 86. The collar engagement tip is configured to engage collar 204 of the fastener 200 about the outer surface thereof, and to preclude rotation of the collar relative to the collar engagement tip. The central bore 84 includes a pin shaft portion 87 which allows for the pin shaft to extend through the upper collar portion, with the engagement end of the pin shaft extending through the collar engagement tip 80 of the upper collar portion (with the pin shaft and the collar engagement tip being substantially concentric, as shown in the Figures). The flange 86 is disposed on the outer surface of the upper collar portion, in the configuration shown, space apart from the lower end 82.

The lower collar portion 74 includes upper insertion portion 90 and lower flange 92. The upper insertion portion 90 extends into the lower collar portion 88 of the central bore of the upper collar portion 72. The flange 92 is positioned within the hub 78.

The telescopic control assembly 76 includes pin members 94a, 94b that are fixed to the lower collar portion and which extend radially therefrom through corresponding slot members 96a, 96b in the upper collar portion. Based on the vertical orientation of the slot members, the pin members are generally allowed to slidably move in a generally vertical direction along the slots (wherein the interaction defines the relative slidable, telescopic movement therebetween). It will be understood that other features on the upper and lower collar portions can serve to likewise limit relative travel. Such other features may comprise slots on the lower collar portion with pins located on the upper portion, interacting flange members, interacting tabs and slots, among other structures. The biasing member 79 directs biases the upper collar portion telescopically away from the lower collar portion where there is no force applied to the lower or upper collar portions.

The hub 78 includes cavity 97, upper flange 98 and lower mount flange 99. The hub 78 is fixedly coupled to the upper surface of the mount plate of base 40 and the lower collar portion 74 is positioned so that the lower flange 92 is captured between the upper surface of the mount plate and the upper flange 98. The lower collar portion (and, in turn, the upper collar portion) is permitted to rotate relative to the hub 78. Such rotation may be facilitated by bearings that are mounted within the hub. The lower collar portion is generally precluded from relative translative movement in the vertical direction in relation to the hub. The upper collar portion is permitted to translate (or telescope) a predetermined distance vertically relative to the lower collar portion and the hub, as controlled by the telescopic control assembly 76.

Figure 6:
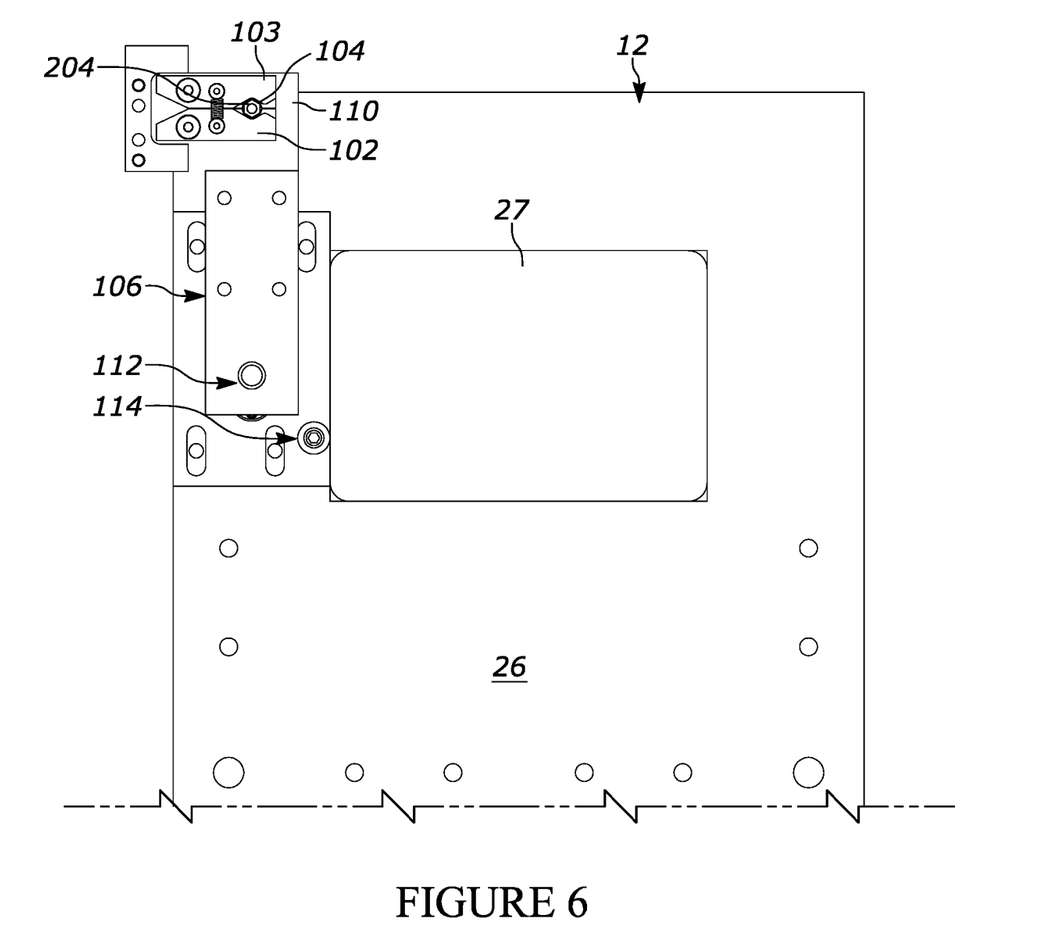
FIG. 6 of the drawings is a partial bottom plan view of a portion of the frame and the collar presenting assembly, in a first position.
Figure 7:
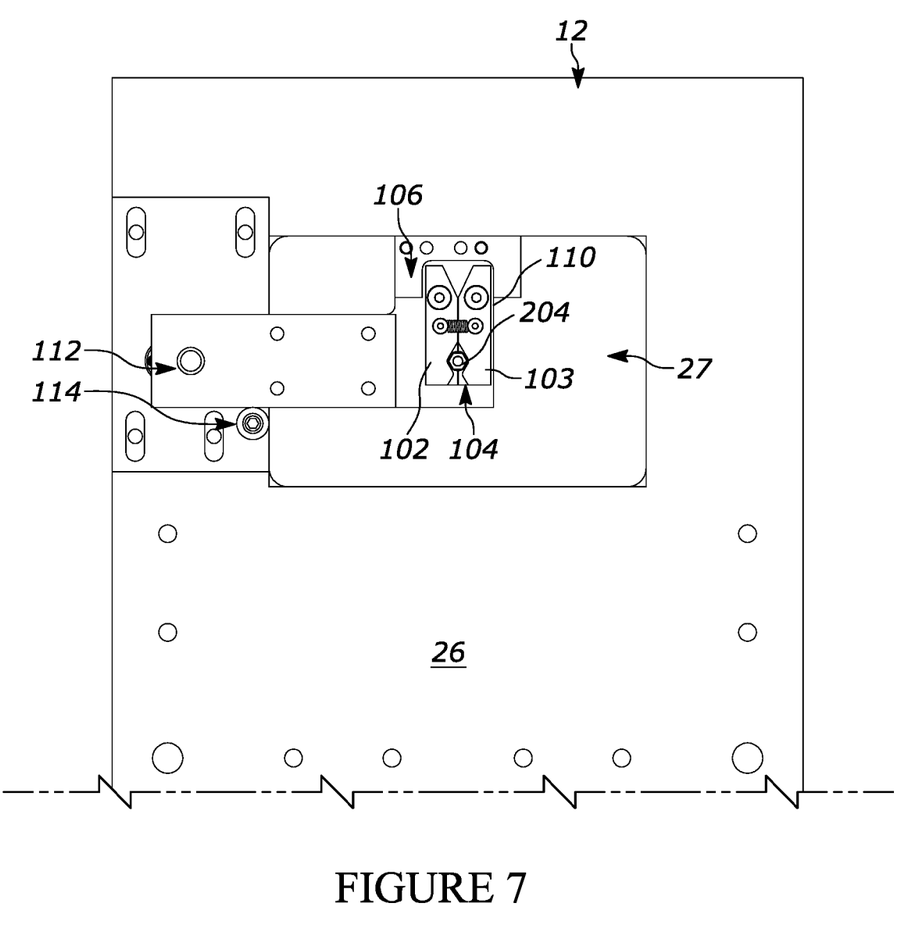
FIG. 7 of the drawings is a partial bottom plan view of a portion of the frame and the collar presenting assembly, in a second position.

With reference to FIGS. 6 and 7, the collar presenting assembly 18 is shown in greater detail as having gripping jaws 102, 103 and movement assembly 106. As set forth above, the collar presenting assembly 18 can be fit with a collar and can position and retain the collar in the proper location so as to be grasped and retained by the collar coupling assembly 70, and more particularly, the collar engagement tip 80.

In the configuration shown, the gripping jaws include a pair of jaws that can pivot relative to each other and that define a collar receiving and retaining region 104. The movement assembly 106 includes a jaw retainer 110 which holds the jaws while allowing for relative pivoting of the jaws relative to each other, a pivot axis 112 and a stop member 114. The pivot axis allows the jaw retainer 110 along with the gripping jaws 102, 103 to be moved into position for transfer of the collar to the fastener drive assembly and then moved out of the way once the collar has been transferred and positioned on the collar engagement tip of the collar coupling assembly. The stop member 114 provides a member that stops the pivoting of the jaw retainer once the desired transfer position has been reached.

It will be understood that the collar presenting assembly 18 is shown in a manual configuration. In a more automated, or fully automated process, collars can be sequentially introduced through a number of different configurations, utilizing slides, guides and other structures which can quickly and in serial production deliver a collar to the proper position for grasping by the collar engagement tip. Additionally, even for manual processes, other configurations are contemplated, including the manual position of the collar onto the collar engagement tip by an operator, among other solutions. The collar presenting assembly shown, is merely exemplary of one such assembly, and is not to be deemed limiting.

The operation of the fastening system will be described with respect to the configuration shown, and with reference to FIGS. 11 through 14, which show the operation schematically. It will be understood that the operation is of an exemplary operation and that it is not to be deemed limiting. For example, in some configurations, more fully automated processes (some of which may be set forth explicitly, and some of which will be known to one of skill in the art), can be employed, utilizing the principles of the present explanation of the operation.

Figure 11:
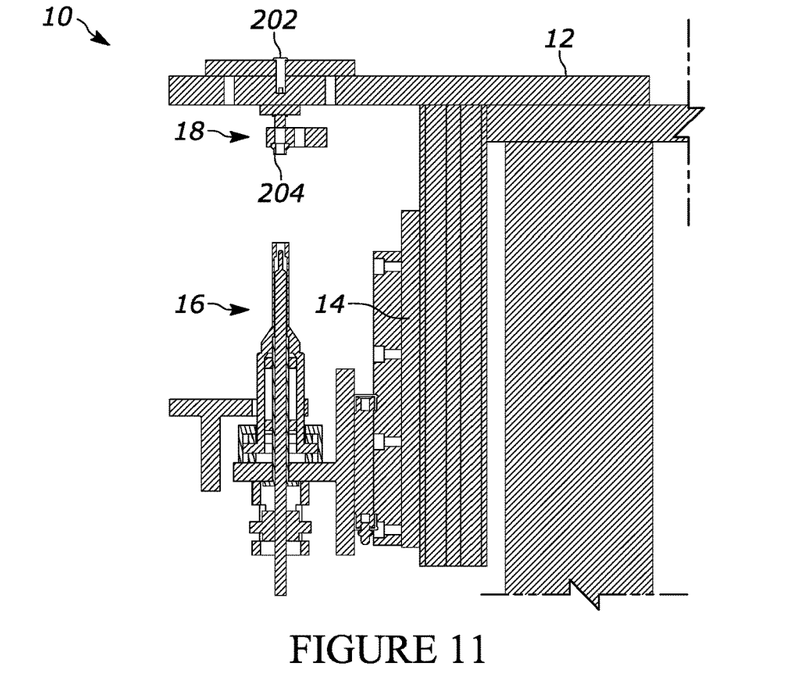
FIGS. 11 through 14 represent a sequential operation of the fastening system from the grasping of a collar to the coupling of the collar to a threaded pin to complete the coupling thereof.

More specifically, and with reference to FIG. 11, in operation, a user would position a part on the upper surface 24 of the part presentation member of the frame. The user can direct the threaded pin through an opening in the part (often an interference fit), and position the part so that the threaded pin is generally in a vertical orientation visible through the window 27 and generally aligned with the engagement end of the pin shaft 52. It will be understood that clamps, jigs or other structures can be employed so as to quickly position the part into the proper orientation for engagement and coupling of the fastener. Additionally, devices, such as a press or the like can be employed to press against the head of the threaded pin (where the pin is not within an opening in a tight press fit, for example) so that the pin does not back out of the opening through which it has been directed while the collar is attached. In another configuration, it is contemplated that grippers may be located on the same side of the opening as the threaded portion and that the grippers can grasp the fastener above the threaded portion, for example, to hold the fastener in place when the collar is coupled (as opposed to, or in addition to, the utilization of a press, for example).

Once the part is positioned and secured as desired, a corresponding collar is fed into the gripping jaws of the collar presenting assembly. The gripping jaws are then pivoted about the pivot axis to direct the collar into alignment with the fastener drive assembly and with the threaded pin of the part coupled to the frame as depicted in FIG. 11.

Once the collar is positioned, the fastener drive assembly 16 is moved relative to the base through the movement control assembly toward the gripping jaws. That is, the fastener drive assembly is coupled to the block 32 which is slidably moved relative to the rail 30. In the configuration shown, such movement is manually accomplished by grasping the handle mounted to the base 40 of the fastener drive assembly. In other configurations, the movement may be automated (for example through a servo drive such as is shown in FIGS. 11 through 14 at 400).

Figure 12:
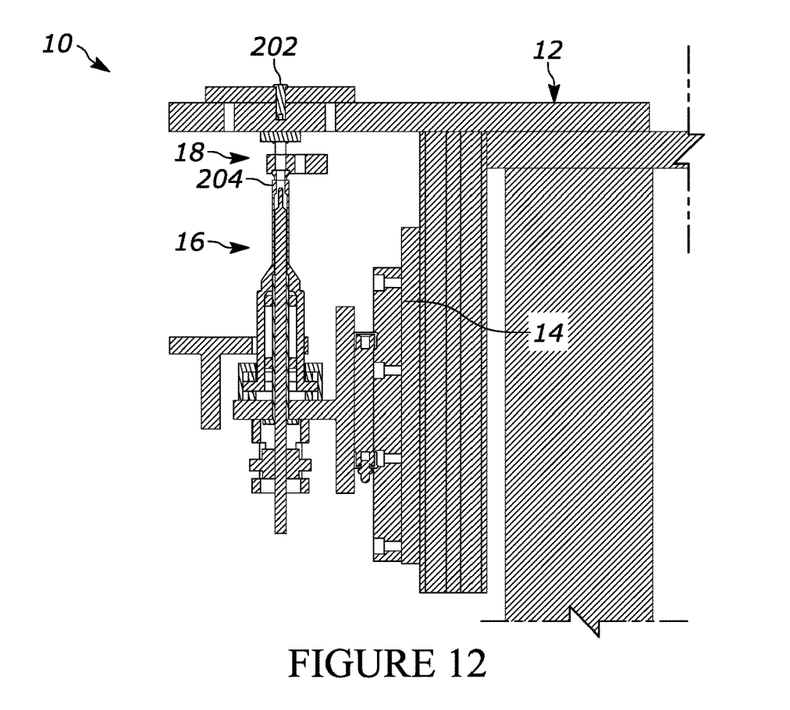

Eventually, and with reference to FIG. 12, through the relative movement, the pin shaft 52 the collar engagement tip engages the collar (depending on the configuration, the pin shaft may be recessed as shown, or may extend through the collar prior to the collar engagement tip engaging the collar). Continued movement of the collar engagement tip can compress the biasing member 79 if the alignment of the collar does not match the alignment of the collar engagement tip of the upper collar portion. To align the two structures, the upper collar portion is then rotated slowly relative to the base 40 while the collar is stationary within the gripping jaws. Eventually, the collar and the collar engagement tip align, the biasing means directs the upper collar portion upwardly so as to seat the collar into the collar engagement tip. It will be understood that if the collar has a hexagonal outer surface, a rotation of 70° or less should be required to align the collar with the collar engagement tip.

Once seated, the gripping jaws can be pivoted out of the way and to their original position. As the jaws are pivoted, due to the configuration of the jaw retainer, the jaws expand and release the collar so that the collar remains seated within the collar engagement tip.

Figure 13:
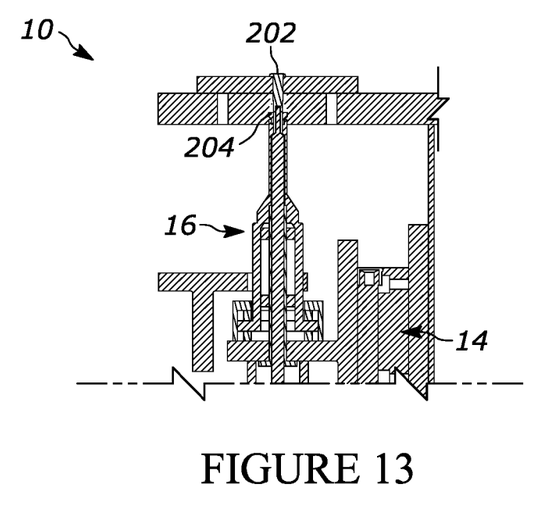

With the collar presenting assembly and the gripping jaws being moved out of the path of the fastener drive assembly, the fastener drive assembly can move vertically toward the distal end of the threaded pin (again manually, or through a linear actuator, a servo drive or another automatable movement directing member). With reference to FIG. 13, eventually, the engagement end of the pin shaft contacts the distal end of the threaded pin. Further vertical movement will begin to compress the biasing member. If the structures are not aligned, then the user can rotate the pin shaft relative to the base housing (whose relative motion is limited by the interaction between the opposing projections and the control openings). Once the engagement end aligns with the engagement bore of the threaded pin, the biasing member will force the engagement end into the engagement bore of the threaded pin.

Once the engagement end of the pin shaft is seated within the engagement bore, further vertical movement moves the collar toward the threaded pin. It will be understood that such continued vertical movement moves the structure, while the pin shaft remains in a fixed orientation. The pin shaft therefore moves relative to the upper and lower collar portions and the biasing member maintains the seated configuration of the pin shaft within the engagement bore.

Eventually, the collar contacts the threaded pin. In some configurations, it may be desirable to rotate the collar in a reverse direction as the structures contact so as to limit and/or preclude cross-threading, and to properly engage and align the threads of the collar with the threads of the threaded pin.

Figure 14:
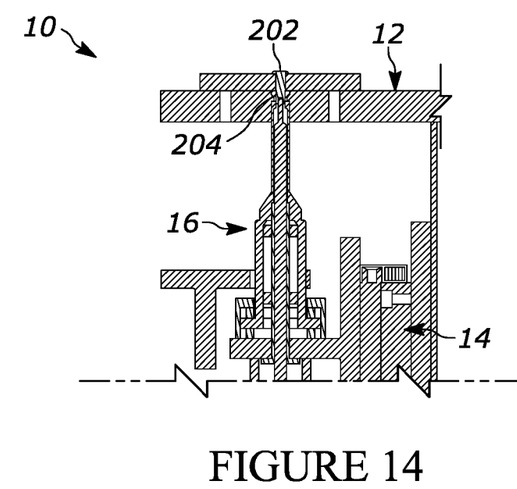

Once aligned, and with reference to FIG. 14, the user can rotate the upper collar portion while also advancing the base along the rail of the movement control assembly. To ensure that the relative position of the collar and the threaded pin is maintained (i.e., that the upper collar portion is not too low or too high, the biasing member imparts a force onto the upper collar portion to maintain the engagement with the collar member and to maintain force against the collar member during the rotation and threaded engagement thereof with the threaded pin).

It will be understood that the upper collar portion may be rotated manually, through a hand tool, or the process may use an automated structure that can be driven by a servo-motor, a pneumatic drive, an actuator or other device. Once the desired torque is reached, the fastener drive assembly can be moved away from the part and the fastener that has just been fastened. As the fastener drive assembly retreats, the collar engagement tip disengages from the collar and the engagement end of the pin shaft retreats from the engagement bore of the threaded pin. Eventually, the fastener drive assembly is fully disengaged. The part can then be removed by decoupling the same from the frame.

This process can be repeated over and over to assemble multiple fasteners onto parts. It will be understood that the system can be varied in a number of manners. For example, any of the manual steps can be automated through suitable automation equipment. Additionally, other manners of presenting and transferring the collar to the fastener drive assembly may be employed, some of which may be more suitable for full automation. The fastener drive assembly can further be modified so as to achieve faster or slower engagement and fastening, as well as utilizing other structures for purposes of alignment of the collar to the threaded pin, the collar to the collar engagement tip and/or the engagement end of the pin shaft to the engagement bore of the threaded pin. Additionally, it may be configured for some fasteners that the pin is rotated while the collar is stationary, or that there is relative movement of each. In the configuration shown, typically, the threaded pin is in a interference fit within the opening, the collar is typically spun onto the threaded pin, however the disclosure is not so limited, and it will be understood as to how to achieve rotation of either or both of the threaded pin and the collar. Of course, these modifications are not exhaustive, but merely exemplary.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A fastener drive assembly comprising:
   a base;
   a collar coupling assembly having a collar portion extending from and terminating at a collar engagement tip, the collar engagement tip structurally configured to engage a collar having a threaded bore;
   a pin coupling assembly having a pin shaft extending away from the base, within the collar portion and through the collar engagement tip, the pin shaft terminating at an engagement end that is structurally configured to engage an engagement bore of a threaded pin;

at least one of the collar engagement tip and the pin shaft being rotatable relative to the other of the collar engagement tip and the pin shaft, so as to impart relative rotation of the engagement end of the pin shaft and the collar engagement tip about an axis of rotation;

at least one of the engagement end of the pin shaft and the collar engagement tip being translatable relative to the base along the axis of rotation of the pin shaft; and wherein the collar coupling assembly further includes an upper collar portion and a lower collar portion, with the upper collar portion terminating in the collar engagement tip, and, being translatable relative to the lower collar portion along the axis of rotation of the pin shaft, while the upper and lower collar portions are precluded from rotation relative to each other about the axis of rotation.

2. The fastener drive assembly of claim 1 wherein the upper collar portion and the lower collar portion are telescopically coupled to each other.

3. The fastener drive assembly of claim 1 wherein the collar coupling assembly includes a telescopic control assembly including a slot member defined in one of the upper and lower collar portions and a pin member slidably positionable within the slot member positioned on the other of the upper and lower collar portions, wherein the movement of the pin member within the slot member defines the relative translation of the upper collar portion relative to the lower collar portion.

4. The fastener drive assembly of claim 3 further including a biasing member extending between the lower collar portion and the upper collar portion to direct the pin member to an end of the slot member, and so as to direct the collar engagement tip away from the base.

5. The fastener drive assembly of claim 1 wherein the pin coupling assembly is rotatable relative to the base about the axis of rotation through an arcuate distance that is less than a full circle and is precluded from a full rotation about the axis of rotation.

6. The fastener drive assembly of claim 1 wherein the pin coupling assembly is translatable along the axis of rotation between a first position and a second position, wherein in the second position, the engagement end is directed away from the base, with a biasing member directing the pin coupling assembly into the second position.

7. The fastener drive assembly of claim 1 further including a driver coupled to the upper collar portion or the lower collar portion to impart rotation thereto.

8. A fastening system comprising:
a frame having a part presentation member with an upper surface;
a fastener drive assembly including:
a base;
a collar coupling assembly having a collar portion extending from the and terminating at a collar engagement tip, the collar engagement tip structurally configured to engage a collar having a threaded bore;
a pin coupling assembly having a pin shaft extending away from the base, within the collar portion and through the collar engagement tip, the pin shaft terminating at an engagement end that is structurally configured to engage an engagement bore of a threaded pin;

at least one of the collar engagement tip and the pin shaft being rotatable relative to the other of the collar engagement tip and the pin shaft, so as to impart relative rotation of the engagement end of the pin shaft and the collar engagement tip about an axis of rotation; and at least one of the engagement end of the pin shaft and the collar engagement tip being translatable relative to the base along the axis of rotation of the pin shaft;

wherein the fastener drive assembly is translatable relative to the frame to direct the fastener drive assembly toward and away from the upper surface of the part presentation member; and wherein the collar coupling assembly further includes an upper collar portion and a lower collar portion, with the upper collar portion terminating in the collar engagement tip, and, being translatable relative to the lower collar portion along the axis of rotation of the pin shaft, while the upper and lower collar portions are precluded from rotation relative to each other about the axis of rotation.

9. The fastening system of claim 8 further comprising a collar presenting assembly including:
a pair of gripping jaws structurally configured to grasp the collar of a fastener;
a movement assembly including a pivot axis coupled to the frame, with the gripping jaws being pivotably coupled to the pivot axis, wherein the pair of gripping jaws can be pivoted into a position about the pivot axis so that a collar positioned with the pair of gripping jaws aligns with the collar engagement tip of the collar coupling assembly, whereupon translating of the fastener drive assembly relative to the frame directs the collar member into the collar coupling assembly.

10. The fastening system of claim 9 wherein the gripping jaws are structurally configured whereupon pivoting of the pair of gripping jaws about the pivot axis with a collar positioned within the collar engagement tip and within the gripping jaws releases the collar from within the gripping jaws without releasing the collar from the collar engagement tip.

11. The fastening system of claim 10 further including a movement control assembly having a rail coupled to the frame, a block slidably movable along the rail, the block being coupled to the base of the fastener drive assembly, and a movement actuator structurally configured to control movement of the block along the rail, thereby adjusting the position of the fastener drive assembly relative to the part presentation member of the frame.

12. A method of attaching a fastener to a part comprising the steps of:
providing a part on a part presentation member, the part having an opening extending therethrough;
providing a fastener including a threaded pin having an engagement bore at a distal end thereof and a collar;
directing the threaded pin through the opening;
providing a fastener drive assembly, the fastener drive assembly comprising:
a base;
a collar coupling assembly having a collar portion extending from and terminating at a collar engagement tip, the collar engagement tip structurally configured to engage a collar having a threaded bore;
a pin coupling assembly having a pin shaft extending away from the base, within the collar portion and through the collar engagement tip, the pin shaft terminating at an engagement end that is structurally configured to engage an engagement bore of a threaded pin;

at least one of the collar engagement tip and the pin shaft being rotatable relative to the other of the collar engagement tip and the pin shaft, so as to impart relative rotation of the engagement end of the pin shaft and the collar engagement tip about an axis of rotation; and at least one of the engagement end of the pin shaft and the collar engagement tip being translatable relative to the base along the axis of rotation of the pin shaft;

positioning the collar in the collar engagement tip; —directing the fastener drive assembly toward the part;

directing the engagement end of the pin shaft into the engagement bore of the threaded pin;

directing the collar engagement tip into engagement with a threaded portion of the threaded pin;

rotating at least one of the collar engagement tip and the pin shaft relative to the frame to thread the collar onto the threaded portion of the threaded pin;

translating at least one of the collar engagement tip and the pin shaft relative to the part presentation member during the step of rotating; and wherein the collar coupling assembly further includes an upper collar portion and a lower collar portion, with the upper collar portion terminating in the collar engagement tip, and, being translatable relative to the lower collar portion along the axis of rotation of the pin shaft, while the upper and lower collar portions are precluded from rotation relative to each other about the axis of rotation.

13. The method of claim 12 wherein the step of positioning the collar in the collar engagement tip further comprises the steps of:

placing the collar in a pair of gripping jaws;

moving the pair of gripping jaws such that the collar overlies the collar engagement tip of the collar coupling assembly;

directing the fastener drive assembly so that the collar is positioned within the collar engagement tip;

moving the pair of gripping jaws to, in turn, release the collar from the gripping jaws.

14. The method of claim 12 wherein the step of positioning the collar in the collar engagement tip further comprises the step of:

rotating the collar engagement tip in either one of a first direction and a second direct so as to align the collar with the collar engagement tip.

15. The method of claim 14 wherein prior to the step of rotating the collar engagement tip, the method further comprises the steps of:

contacting the collar engagement tip with the collar;

biasing the collar engagement tip against collar.

16. The method of claim 12 wherein the step of directing the engagement end of the pin shaft into the engagement bore of the threaded pin further comprises the step of:

rotating the pin shaft to align the engagement end with the engagement bore.

17. The method of claim 16 wherein prior to the step of rotating the engagement end of the pin shaft, the method further comprises the steps of:

contacting the engagement end of the pin shaft with the distal end of the threaded pin;

biasing the pin shaft against the distal end of the threaded pin.

18. The method of claim 12 wherein the step of rotating at least one of the collar engagement tip and the pin shaft further comprises the step of:

rotating the collar engagement tip with a servomotor; and precluding rotation of the pin shaft relative to the collar engagement tip.

19. The method of claim 12 wherein the steps of directing the fastener drive assembly toward the part comprises the step of controlling a servomotor.

* * * * *